No. 741,953. PATENTED OCT. 20, 1903.
H. E. BONSCHUR.
EYEGLASSES.
APPLICATION FILED AUG. 22, 1903.
NO MODEL.
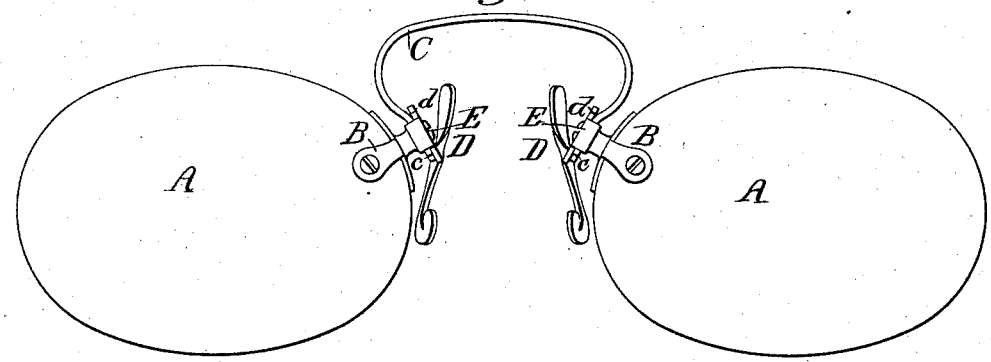
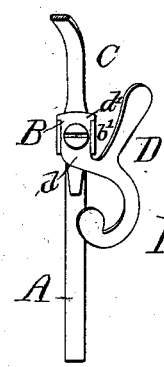
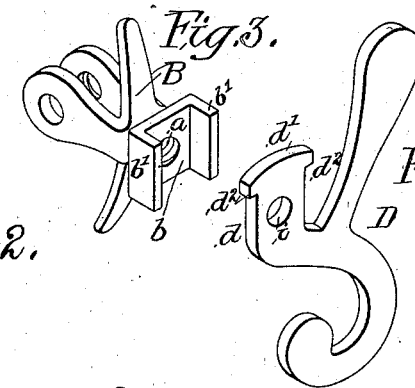
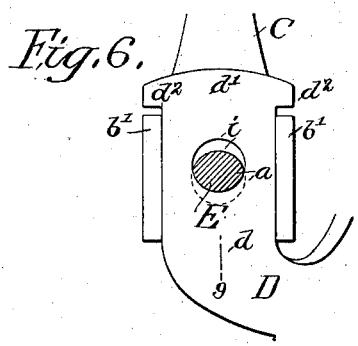
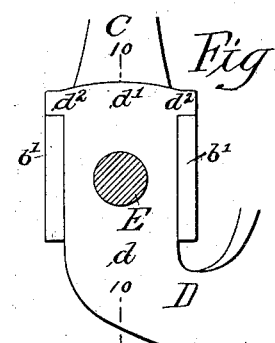
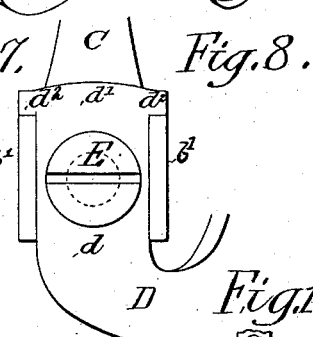
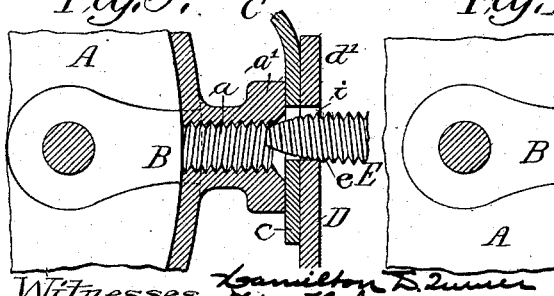
Inventor:
Herman E. Bonschur,
by his Attorneys,
Howson & Howson
Witnesses.

No. 741,953. Patented October 20, 1903.

UNITED STATES PATENT OFFICE.

HERMAN E. BONSCHUR, OF PHILADELPHIA, PENNSYLVANIA.

EYEGLASSES.

SPECIFICATION forming part of Letters Patent No. 741,953, dated October 20, 1903.

Application filed August 22, 1903. Serial No. 170,426. (No model.)

*To all whom it may concern:*

Be it known that I, HERMAN E. BONSCHUR, a citizen of the United States, residing in Philadelphia, Pennsylvania, have invented certain Improvements in Eyeglasses, of which the following is a specification.

My invention relates to certain improvements in eyeglasses, for which application for patent was filed by me on the 11th day of March, 1903, Serial No. 148,355, and allowed July 31, 1903.

The object of the present invention is to provide means for rigidly securing the guard to the post. This object I attain in the manner hereinafter set forth, reference being had to the accompanying drawings, in which—

Figure 1 is a view of a pair of eyeglasses, showing my improvement. Fig. 2 is a section on the line 2 2, Fig. 1. Fig. 3 is a detached perspective view of the post. Fig. 4 is a detached perspective view of the guard. Fig. 5 is a detached perspective view of one form of screw for securing the guard to the post. Fig. 6 is a view showing the guard applied to the post and prior to its being fastened thereto, the screw being in section. Figs. 7 and 8 are views similar to Fig. 6, showing the guard rigidly attached to the post. Fig. 9 is a section on the line 9 9, Fig. 6. Fig. 10 is a section on the line 10 10, Fig. 7; and Figs. 11 and 12 are views illustrating modifications of my invention.

A A are the lenses, to each of which is attached an ordinary post B, having a socket $b$, formed by two side flanges $b'$ $b'$, and each post is secured to its lens by means of a clip and a screw. This form of post is the standard and is the one now used by the majority of opticians. The socket $b$ is deep enough in the present instance to receive the end or arm of the bow C and an arm $d$ of a guard D, both the bow and the arm fitting snugly between the flanges $b'$ of the post.

On the end of the arm $d$ of the guard D in the present instance is a head $d'$, forming lateral shoulders $d^2$, which rest upon the ends of the flanges $b'$ of the post. The arm $d$ is perforated at $i$, as well as the end of the bow C, and passing through the perforations and into an orifice $a$ in the post is a screw E, which confines the guard and the bow to the post.

In order to bring the shoulders $b^2$ of the guard firmly down upon the ends of the flanges $b'$ of the post, so as to prevent the least movement of the guard on its screw, I form the opening $i$ in the arm of the guard out of line with the orifice $a$ in the post, as shown clearly in Fig. 6, and I preferably bevel the end $e$ of the screw E, so that it will readily enter the openings. By this means the threads of the screw will readily engage the threads in the wall of the orifice $a$ and yet the screw will be allowed a certain free rocking movement, so that after the screw is in position the shoulders of the guard can be readily passed over the ends of the flanges of the socket, and on turning the screw the shoulders will be drawn firmly against the ends of the said flanges $b'$, as shown clearly in Fig. 7, as the screw will tend to aline the opening $i$ in the arm of the guard with the orifice in the post and the head of the screw will hold the arm rigidly in the socket of the post, as clearly shown in Figs. 8 and 10.

In some instances a plain screw may be used, which can be forced into the orifice $a$ of the post through the opening $i$ in the arm of the guard; but I prefer to bevel the ends of the screw, as it makes it easier to apply the screw to the post.

In order that the screw may enter the orifice $a$ more freely, I preferably countersink the orifice, as indicated at $a'$, Fig. 9, this countersinking enabling the screw to enter more readily the threads in the post. In some instances I may make the shoulders on the arm of the guard, as indicated in Fig. 11, so as to bear against the lower ends of the flanges of the post. In fact, the shoulders may be placed in any position, providing the orifice in the arm of the guard is out of line with the orifice in the post.

While I have shown my invention as applied to a guard having the shape claimed in the aforesaid application, it will be understood that my invention may be applied to any-shaped guard without departing from my invention.

The arms $c$ $c$ of the bow C may also be provided with shoulders, as shown in Fig. 12, and these shoulders may be drawn tightly against the flanges of the post in the same manner as the shoulders on the arm of the guard without departing from my invention.

I claim as my invention—

1. The combination in eyeglasses of a lens, a post secured to the lens, said post having side flanges and a screw-threaded orifice between the side flanges, and an arm having shoulders bearing against the ends of the side flanges, the opening in the arm being out of line with the opening in the post, and a confining-screw for confining the arm to the post and for drawing the shoulders down tightly upon the flanges of the post, substantially as described.

2. The combination in eyeglasses of a post having flanges, and a screw-threaded orifice, a guard having a shouldered arm and having an opening therein, the said shoulders of the arm arranged to rest against the flanges of the post, the opening of the arm being out of line with the orifice in the post, and a screw for confining the guard to the post, the shoulders of the guard being drawn against the shoulders of the post when the screw is applied, substantially as described.

3. The combination in eyeglasses of a lens, a post secured to the lens, said post having a screw-threaded orifice and side flanges forming a socket, a guard having an arm fitting the socket and having shoulders arranged to rest against the ends of the flanges of the post, and having an opening out of line with the orifice in the post, a screw reduced at its outer end so that the screw can readily enter the opening in the guard and the orifice in the post, and when turned will draw the shoulders of the guard tightly against the flanges of the post, substantially as described.

4. The combination in eyeglasses of a lens, a post secured to the lens, said post having a screw-threaded orifice and side flanges forming a socket, a guard having an arm fitting the socket and having shoulders arranged to rest against the ends of the flanges of the post, and having an opening out of line with the orifice in the post, a screw beveled on two sides so that it can enter the opening in the guard and the orifice in the post, substantially as described.

5. The combination in eyeglasses of the lens, a post secured to the lens, said post having side flanges forming a socket, a threaded orifice in the post between the side flanges, said orifice being countersunk, a guard having shoulders arranged to bear against the side flanges, and a screw for confining the guard to the post, substantially as described.

In testimony whereof I have signed my name to this specification in the presence of two subscribing witnesses.

HERMAN E. BONSCHUR.

Witnesses:
JAMES C. KRAYER,
JOS. H. KLEIN.